(12) United States Patent
Davis, Jr. et al.

(10) Patent No.: US 6,380,718 B1
(45) Date of Patent: Apr. 30, 2002

(54) METHOD AND APPARATUS FOR VOLTAGE REGULATION VIA PSEUDO-RANDOM PWM MODULATION

(75) Inventors: Gerald Wesley Davis, Jr., New Berlin; Robert Thomas Wolfe, South Milwaukee, both of WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 33 days.

(21) Appl. No.: 09/650,614

(22) Filed: Aug. 30, 2000

(51) Int. Cl.$^7$ ................................. H02P 9/00
(52) U.S. Cl. ........................ 322/28; 322/25; 318/811
(58) Field of Search ............................ 322/22, 23, 24, 322/25, 27, 28; 318/811; 290/7

(56) References Cited

U.S. PATENT DOCUMENTS

| | | | | |
|---|---|---|---|---|
| 5,023,538 A | * | 6/1991 | Mutoh et al. | 318/811 |
| 5,506,484 A | * | 4/1996 | Munro et al. | 318/599 |
| 5,739,677 A | * | 4/1998 | Tsutsui et al. | 322/25 |
| 5,903,128 A | * | 5/1999 | Sakakibara et al. | 318/721 |
| 5,990,658 A | * | 11/1999 | Kerkman | 318/811 |
| 6,002,226 A | * | 12/1999 | Collier-hallman et al. | 318/439 |
| 6,091,887 A | * | 7/2000 | Dieterle et al. | 388/811 |
| 6,118,186 A | * | 9/2000 | Scott et al. | 290/40 B |
| 6,188,189 B1 | * | 2/2001 | Blake | 318/471 |

* cited by examiner

Primary Examiner—Nicholas Ponomarenko
(74) Attorney, Agent, or Firm—Michael A. Jaskolski; Alexander M. Gerasimow; William R. Walbrun

(57) ABSTRACT

A method and apparatus for increasing the voltage resolution of a PWM controller wherein the controller controls pulse width as a function of a PWM register count having a maximum count X where 1 part in X affords insufficient resolution, the method including receiving a high resolution voltage request count from within the range 0 through count Y where the voltage corresponding to count Y is equal to the voltage corresponding to count X and where count Y is greater than count X, the method including dividing the request signal by a divisor (Y/X) to generate an output value and a remainder, identifying a pseudo-random number within the range of possible remainder values, comparing the pseudo-random number to the remainder, where the pseudo-random number is less than the remainder, incrementing the output value, providing the output value to the PWM register as the register count and repeating the aforementioned steps.

20 Claims, 3 Drawing Sheets

METHOD AND APPARATUS FOR VOLTAGE REGULATION VIA PSEUDO-RANDOM PWM MODULATION

BACKGROUND OF THE INVENTION

The present invention relates to PWM modulation and more specifically to a method and apparatus for increasing voltage resolution across a generator exciter field coil where the exciter voltage is determined by a counter that is less precise than a desired voltage resolution.

Pulse width modulation (PWM) hardware configurations and control algorithms are used in many different control applications. One particularly advantageous use of PWM techniques is in controlling generator terminal voltage by varying the voltage across a generator exciter coil. To this end, three-phase AC voltage is fed back from a generator output to an AC to DC rectifier that generates DC voltage across a DC bus link. Typical generator controlling PWM hardware includes an IGBT switch linked between the DC link and the exciter coil. The switch is opened and closed to provide essentially square wave PWM voltage pulses on the line linked to the coil. The width or duration of a voltage pulse divided by a full PWM cycle period is referred to generally as a PWM pulse duty cycle.

Each "on" part of the voltage pulse causes the current through the exciter coil to increase while the "off" part of the pulse causes the current through the exciter coil to decrease. Because the exciter coil consists of a large inductance even after a voltage pulse occurs, the coil continues to draw current as a result of the pulse. For this reason, at any given time the current magnitude is a function of the residual current level at the beginning of the most recent voltage pulse, the duration of the most recent voltage pulse and the period since the most recent voltage pulse. In other words, the current is an integration of temporally proximate previous voltage pulses.

A typical controller for controlling a PWM switch receives an input signal indicating a desired generator terminal voltage and provides output signals to open and close the PWM switch such that the pulse duty cycle causes the desired exciter current. To this end many controllers are equipped with a counter that, based on the desired exciter voltage, adjusts pulse duty cycle by increasing or decreasing the counts corresponding to pulse duty cycles. For example, to increase exciter current, switch on time may be increased from 100 count per PWM cycle to 150 count per PWM cycle.

Where exciter current is based on counter value and a simple counter control algorithm is adopted, exciter current resolution is limited by the maximum counter value. For example, where the maximum counter value is 255, exciter current resolution is one part in 256 (i.e., only 256 different voltage duty cycle durations can be achieved). While such limited resolution may be acceptable in some control applications, such resolution is not acceptable in many other applications and therefore a need exists to increase exciter winding current resolution.

One solution to increase duty cycle resolution is to increase the counter size. Unfortunately, while possible, this solution is impractical in existing systems that employ a relatively low maximum value counter. In addition, the costs associated with redesigning existing controller configurations to accommodate a higher maximum value counter would be excessive.

Another solution to increasing the effective resolution of the exciter duty cycle has been to provide sequences of voltage pulses that together, over a short period, generate a relatively higher resolution average coil voltage. In this regard it has been recognized that, because the exciter coil is inductive and hence instantaneous current is generally a current integration caused by temporally proximate voltage pulses, the instantaneous effective voltage across the coil can be adjusted to between first and second resolutions by causing consecutive voltage pulses at first and second duty cycles corresponding to the first and second resolutions, respectively. For example, to achieve a resolution corresponding to a count 175.5, the controller controls the duty cycle to generate consecutive voltage pulses having 175 and 176 counts, respectively (i.e., (175+176)/2=175.5). Similarly, according to a technique referred to as a "fraction of four" approach, to achieve a resolution of 125.25, the controller controls the duty cycle to generate consecutive voltage pulses having 126, 125, 125 and 125 counts, respectively.

While the fraction of four and other similar techniques achieve fractional duty cycle resolution, these techniques also have shortcomings. In particular, these techniques result in the appearance of limit cycles in the generator terminal voltage. The limit cycles were caused by the control algorithm cycling through a discrete number of states in an attempt to hold the output voltage to a regulation set point and appear as a complex, somewhat sinusoidal oscillation of the generator output RMS voltage. Limit cycle oscillations are unacceptable in many electric power applications.

Thus, there is a need for a method and/or apparatus that can be employed with existing controllers that employ relatively low maximum value counters to increase voltage resolution without causing limit cycles.

BRIEF SUMMARY OF THE INVENTION

According to the present invention voltage resolution limitations associated with small bit register counters can be overcome while limiting or essentially eliminating the effects of limit cycles using several related control techniques. To this end, when a requested duty cycle is received that has a higher resolution than a register counter, first and second consecutive counts supported by the register counter and corresponding to a lower duty cycle level and an upper duty cycle below and above the requested higher resolution duty cycle, respectively, are identified. Then, over a specific number D of PWM cycles, the first and second counts are selected in a random fashion to form a ratio that is proportional to the difference between the required duty cycle and the lower duty cycle divided by the difference between the upper duty cycle count and the lower duty cycle count. A selected count is provided to the PWM register counter every PWM cycle and is used during the corresponding cycle to generate a PWM pulse having a duration corresponding to the selected count.

In one embodiment, the received requested signal S is within a count range 0 through Y where the voltage value corresponding to count Y is essentially equal to the voltage value corresponding to a maximum register count X and where count Y is greater than count X. For example, maximum counter X may be 255 while maximum request signal value Y maybe 32,767 and each of X (e.g., 255) and Y (e.g., 32,767) may correspond to 20 volts. In this case, count 128 on the X scale would equal count 16,384 on the Y scale and each would correspond to 10 volts. In this case, the step of identifying the first count includes dividing the request signal S by the value D to obtain the first count and a remainder R where value D is essentially equal to Y/X (i.e., is equal to the integer portion of Y/X) and the step of identifying the second count includes incrementing the first count. In the present example where Y is 32,767 and X is 255, D is 128.

In one embodiment the step of randomly selecting a PWM count increment includes identifying a random number of N within the range 0 through D−1, comparing the remainder R and number N and, if the random number N is less than remainder R, selecting the second count, else selecting the first count and, over each D PWM cycles, identifying each of 0 through D−1 only once. In one embodiment the step of identifying includes identifying random numbers in different orders during consecutive D PWM cycles.

Thus, one object of the invention is to minimize or eliminate limit cycling. By randomly selecting between the first and second counts instead of selecting the counts in a specific pattern, the periodicity of the selection is randomized and limit cycling is essentially eliminated.

Another object is to provide high resolution voltage levels using a relatively low bit register counter. Resolution between second to first voltage levels is accomplished by controlling the ratio of first and second counts over consecutive PWM cycles where the first and second counts correspond to the first and second voltage levels. The second and first counts are selected in a ratio proportional to the difference between the requested voltage level and the first voltage level divided by the difference between the first and second voltage levels. The ratio is facilitated by providing each random number 0 through D−1 only once during each D PWM cycles.

In another embodiment where the maximum requested signal count Y is at least 8x−1 the random numbers may be selected using a repeating pseudo-random number generator. As the nomenclature implies, a repeating pseudo-random number generator repeats a number sequence periodically. For example, where the generator generates numbers in the 0–127 range, every 128 PWM cycles the number generator repeats the number sequence. It has been recognized that, while using a pseudo-random number generator to generate repeating random number sequences still causes some limit cycling, where the maximum request signal count Y is relatively large (e.g., 8x−1) limit cycling is appreciably reduced and the minimal cycling that remains is acceptable for many applications.

Other processes for generating random numbers are contemplated including using a lookup table, generating a Z-bit random number and scaling the Z-bit number to within the range 0 through D−1, providing a seed number to a congruential number generator.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
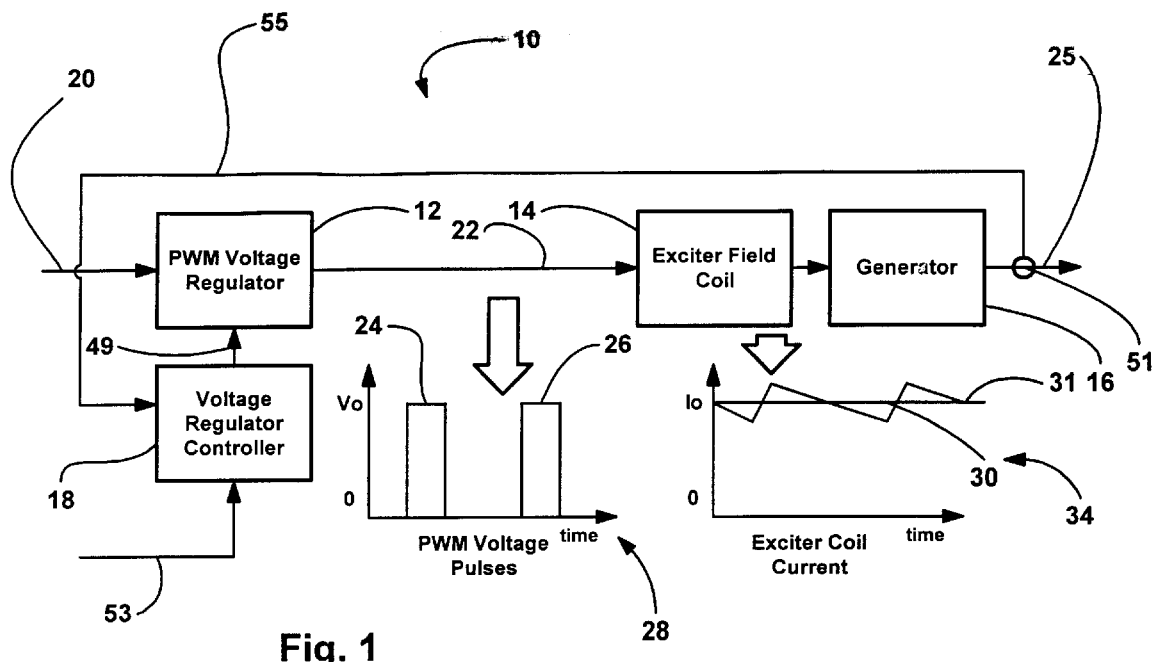
FIG. 1 is a schematic view illustrating an exemplary generator control system according to the present invention including a first graph illustrating two exemplary PWM voltage pulses and a second graph illustrating an exemplary exciter coil current waveform.

Referring now to the drawings wherein like reference characters correspond to similar elements throughout the several views and, more specifically referring to FIG. 1, the present invention will be described in the context of an exemplary generator control system 10. System 10 includes, among other components, a rectifier/PWM (pulse width modulating) voltage regulator 12, an exciter field coil 14, a generator 16 and a voltage regulator controller 18 that are linked together via various voltage buses and control lines as described below. Regulator 12, coil 14 and controller 18 cooperate to control the magnitude of generator 16 output voltage on an output line 25. Line 20 provides single or three-phase AC voltage to regulator 12.

Regulator 12 receives voltage on line 20 and rectifies the voltage as well known in the controls art to generate a DC voltage across a DC bus link (not illustrated). Regulator 12 then converts the DC voltage into PWM voltage pulses on line 22. Two exemplary voltage pulses 24 and 26 are identified in a PWM voltage pulse graph 28 below line 22. Each pulse 24, 26, etc., has a magnitude equal to the instantaneous magnitude of the rectified DC voltage provided from the AC sources on line 20. Each pulse 24, 26, etc., has a duration that is controlled in a manner described below.

PWM switching configurations like the one in regulator 12 are well known in the controls industry and therefore will not be described here in detail. For the purposes of this explanation it should be appreciated that the PWM switching configuration includes a semiconductor switching device (e.g., IGBT's, etc.) that can be opened and closed to delink and link a DC voltage to output line 22, thereby causing pulses 24, 26, etc.

The PWM voltage pulses (24, 26, etc.) are provided across the exciter field coil 14 and generate a current therein. Because coil 14 is inductive, even after a voltage pulse thereacross terminates, the coil continues to draw a current from line 22 through diodes in the regulator 12 and hence, as illustrated in a coil current graph 34 below coil 14, the exciter coil current 30 due to periodic PWM voltage pulses has a saw tooth waveform and has a steady state average value 31. The amplitude of the output voltage of generator 16 is controllable by regulating exciter coil current 30. Thus, generally, by increasing coil current, generator output voltage is increased and by decreasing coil current the generator output voltage is decreased.

Referring still to FIG. 1, the average voltage across coil 14 and hence the exciter coil current 30 can be increased and decreased by regulating the duration of PWM voltage pulses on line 22. For example, by increasing the duration of pulses on line 22, the exciter field coil current 30 is increased while decreasing the duration of pulses on line 22 decreases coil current 30.

Controller 18 provides control signals to the switch of PWM regulator 12 to open and close the switch thereby effectively regulating the PWM voltage pulse durations and hence regulating output voltage of generator 16. To this end, a command voltage is provided to controller 18 via line 53 indicating a desired generator output voltage. Although not illustrated the command voltage may be provided via an interface or an enterprise type controller. A voltage sensor 51 is linked to output line 25 and generates a signal indicating the instantaneous generator voltage output on line 55. Controller 18 receives the generator AC voltage signal via line 55. After comparing the generator RMS voltage level to the commanded voltage level, controller 18 generates control signals on line 49 calculated to cause generator 16 output voltage to be equal to the command voltage.

Figure 2:
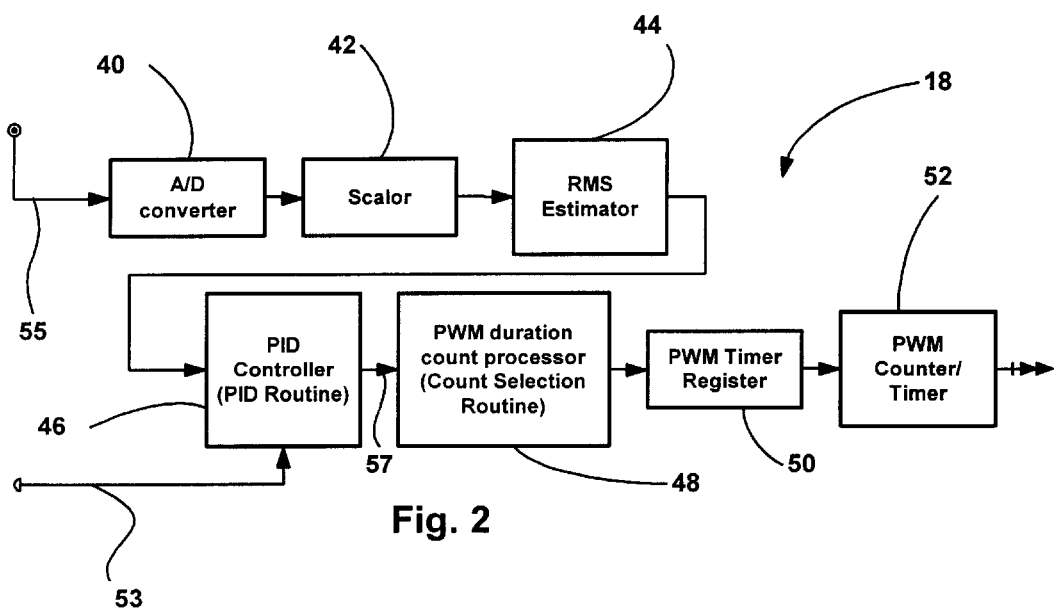
FIG. 2 is a schematic diagram illustrating components of the drive controller of FIG. 1.

Referring now to FIGS. 1 and 2, controller 18 includes an analog-to-digital converter 40, a scaler 42, an RMS estimator 44, a PID controller 46, a PWM duration count determiner 48, a PWM timer register 50 and a PWM counter/timer 52. Sensor 51 (see FIG. 1) generates an analog generator voltage signal on line 55. The converter receives the analog voltage signal and converts the analog signal to a digital signal that is provided to scaler 42. Scaler 42 scales the digital signal down to a signal suitable for signal processing purposes and provides the scaled down signal to RMS estimator 44. Estimator 44 performs an RMS calculation on consecutively received signals and provides its output to the PID controller 46.

In addition to receiving the output of estimator 44, controller 46 receives the command voltage signal on line 53. Controller 46 identifies the difference between the two received signals and uses the difference to generate a high resolution voltage request signal S on line 57. Count determiner 48 receives the voltage request signal S and performs an inventive "count selection" routine to generate a "selected" count for the PWM timer register 50. When the selected count is provided to register 50, register 50 stores the selected count and provides the selected count to counter/timer 52. Counter/timer 52 accesses the count in register 50 and controls the regulator 12 switch to generate a PWM pulse on line 22 having a duration equal to a time corresponding to the selected count. Each PWM cycle the selected count in register 50 is modified by processor 48 as described below.

Figure 3:
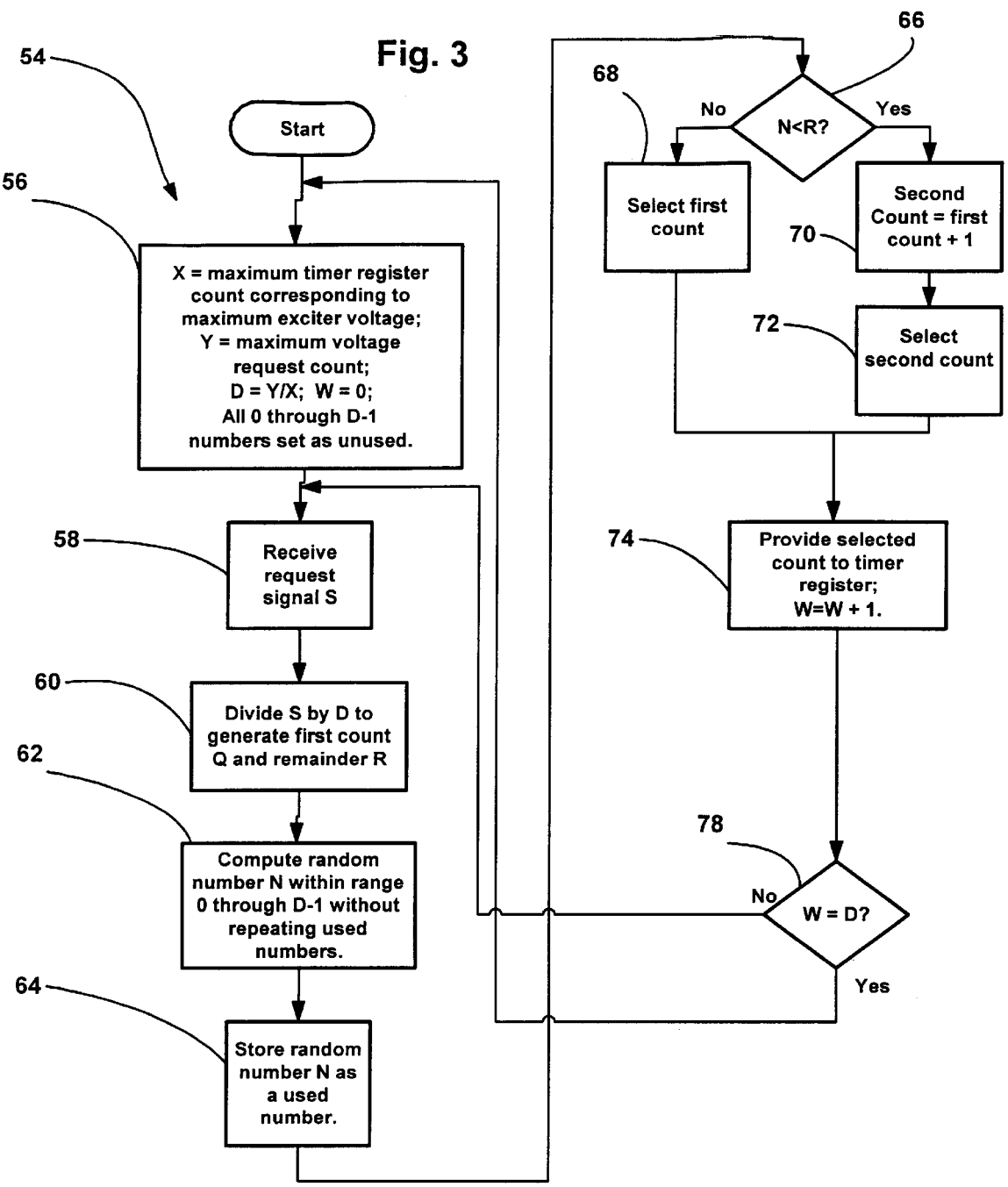
FIG. 3 is a flow chart illustrating an exemplary inventive method.

Referring now to FIG. 3, an exemplary inventive count selection routine 54 performed by PWM duration count determiner 48 is illustrated. In the exemplary routine 54 and for the purpose of this explanation, it will be assumed that a count X is a maximum PWM timer register count and corresponds to a maximum exciter 14 voltage duty cycle (ee FIG. 1). In addition, it will be assumed that a count Y is a maximum voltage request signal count that also corresponds to a maximum exciter 14 voltage duty cycle and that count Y is greater than count X. Where specific numbers are employed in this explanation, in the interest of simplifying the explanation count X is assumed to be 255 (corresponding to the largest 8-bit number) while count Y is assumed to be 32,767 (corresponding to the largest signed 16-bit number), each of the X and Y scales beginning at 0 value. In this case, for example, a value of 128 (i.e., X/2) on the X scale would equal a value of 16,384 on the Y scale (i.e., Y/2).

Referring still to process block 56, initially X is set equal to the maximum timer register count (e.g., 255) and Y is set equal to the maximum request voltage count (e.g., 32,767). In addition, a divisor D is set equal to the value Y+1/X+1. Thus, where Y is 32,767 and X is 255, divisor D is set equal to 128. A PWM cycle counter W is set equal to 0 and all values 0 through D−1 are set as "unused". The terms "used" and "unused" will be employed to indicate random numbers that have been used and random numbers that have not bee used during a current set of D PWM cycles to ensure that each random number within the range 0 through D−1 is only used once per every D cycle set. Use of these terms will be made clear through the following example.

Referring to FIGS. 2 and 3 at process block 58 count processor 48 receives the voltage request signal S via line 57. Request signal S in this example is provided as a count value indicating a precise and high resolution voltage pulse duration requested to conform the generator output voltage on line 25 to the commanded voltage received on line 53. The request signal S is assumed to be within the range 0 through Y. Thus, in the present example, request signal S will have a value between 0 and 32,767. Value S periodically changes. For the purposes of this explanation it will be assumed that an exemplary request signal S has a value of 2256.

Continuing, at block 60 processor 48 divides request signal S by divisor D to generate a first count Q and a remainder value R. Because divisor D is equal to Y+1/X+1, when signal S is divided by divisor D, the quotient or first count Q will be within the range 0 through X and therefore first count Q represents a "rough" estimate of the precise count and pulse duration corresponding to high resolution signal S. After dividing signal S by divisor D, if a remainder occurs (which is most of the time), the requested voltage (i.e., the voltage corresponding to S) corresponds to a fractional count between the first count and the next consecutive count supported by the timer register. Thus, over a set of PWM cycles a sequence of first and second counts can be selected that will cause the effective or average count over the PWM cycle set to equal the fractional count corresponding to signal S.

To cause the average count over the PWM cycle set to equal the fractional count corresponding to signal S, the ratio of second to first counts selected over the PWM cycle set must be essentially proportional to the difference-between the requested voltage level and the voltage level corresponding to the first count divided by the difference between the voltage levels corresponding to the second and first counts. For example, where the first and second counts correspond to 34V and 36V respectively, and the request voltage is 35.25V the ratio of first counts (corresponding to 34V) and second counts (corresponding to 36V) selected over a PWM cycle set is $$62.5/100 \left(\text{i.e.,} \ \frac{35.25 - 34}{36 - 34} = 62.5\%\right).$$

Figure 4:
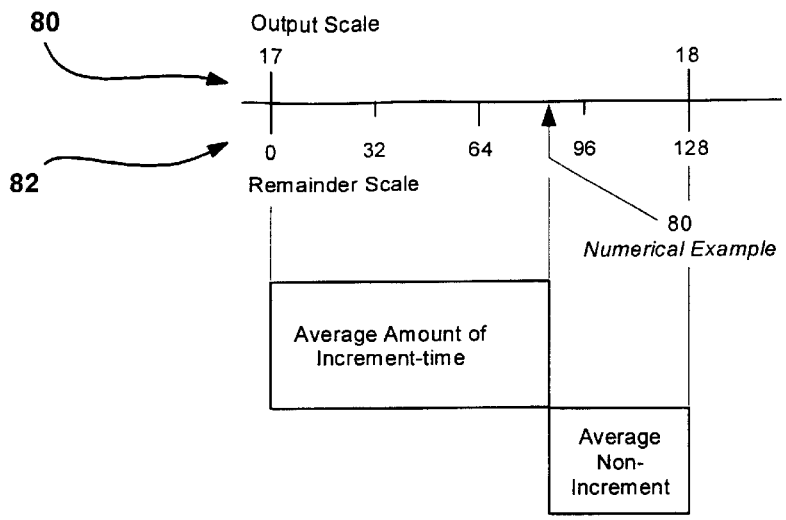
FIG. 4 is a schematic illustrating an exemplary output scale and remainder scale according to the present invention.

Referring now to FIG. 4, an output/remainder scale segment 80 relevant to the present example (i.e., where request signal S is 2256 and divisor D is 128) is illustrated. Relevant segment 80 corresponds to first and second output counts 17 and 18, respectively where a remainder scale 82 (e.g., 0 through 128) is provided between the first and second counts. It has been recognized that the desired first and second count ratio over a PWM cycle set including D cycles can be facilitated by employing the remainder R after signal S is divided by D. The remainder R represents the difference between the first count and signal S and hence represents the difference between the request voltage and the voltage corresponding to the first count. In addition, the first and second consecutive counts (e.g., 17 and 18 in FIG. 4) correspond to the first and second voltage levels and the counts normalize the voltage levels. Thus, the desired second to first count ratio over a PWM cycle set including D cycles is equal to the remainder R divided by D. In the present example, as illustrated in FIG. 4, the number of second counts 18 (i.e., "increment-time" meaning the higher count) is 80 while the number of first counts 17 (i.e., "non-increment time" meaning the lower count) is 48 out of 128. For instance, assuming counts 17 and 18 correspond to 34 and 36V, respectively, and the request voltage is 35.25V, where count 18 is selected 80 times and count 17 is selected 48 times over 128 PWM cycles (i.e., over a PWM cycle set), the resulting average voltage is 35.25 (i.e., (80*36+48*34)/128=35.25).

To facilitate the desired first/second count selection ratio, in one embodiment each of numbers 0 through D−1 (i.e., 127) is used during one of the PWM cycles in a D cycle set. The number used during a cycle is compared to the remainder R and where the used number is less than the remainder R, the second count (e.g., 18 in the present example) is selected and where the used number is greater than or equal to the remainder R the first count (e.g., 17 in the present example) is selected. In this manner, in the present example, for each of numbers 80 through 127 first count 17 is selected and for each of numbers 0 through 79 second count 18 is selected and the desired ratio results.

Importantly, in order to minimize limit cycling and reduce undesirable cyclic operating characteristics the present invention randomly identifies numbers from within the range 0 through D−1. For instance, in the present example, the sequence of numbers used and compared to remainder R may be 8, 12, 92, 46, 100, 102, etc. until every number 0 through D−1 is "used" a single time.

Referring again to FIGS. 2 and 3, at process block 62, processor 48 computes a random number N within the range 0 through D−1 without repeating "used" numbers. During the initial pass through blocks 56 through 62, because all numbers 0 through D−1 were set as unused at block 56, the random number N may be selected from the entire set 0 through D−1. In the present example it will be assumed that random number N is 33 during the initial pass through blocks 56–62.

At block 64 determiner 48 stores the computed random number N as a "used" number so that during the D PWM cycle set the used number is not again repeated. In the present example, the number 33 is stored as used.

At decision block 66, determiner 48 compares the computed random number N to the remainder R. Where the random number N is greater than or equal to the remainder R control passes to process block 68. Where the random number N is less than the remainder R, control passes to block 70. At block 68, determiner 48 selects the first count and control passes to process block 74. At block 70, determiner 48 sets the second count equal to the first count plus 1 and then, at block 72, selects the second count prior to passing control to block 74. In the present example, because random number N is 33 and the remainder R is 80, the random number N is less than the remainder R and control passes to blocks 70 and 72 where the second count (i.e., 18) is selected prior to control passing to block 74. At block 74 the selected count (i.e., 18) is provided to and stored by timer register 50. In addition, at block 74 cycle counter W is incremented by 1.

Referring now to FIG. 2, after the selected count has been provided to register 50, PWM regulator 52 generates a PWM voltage pulse (see also FIG. 1) on line 22 having a width or duration corresponding to the selected value. In the present case, the pulse duration correspond to count 18 during this PWM cycle.

Referring again to FIGS. 2 and 3, at block 78, determiner 48 determines whether or not cycle counter W is equal to divisor D. Where counter W is not equal to divisor D only a sub-set of the range of 0 through D−1 numbers has been selected as random numbers N and therefore control passes back to block 58 where request signal S is again read. Again, at block 60 signal S is divided by divisor D generating Q and remainder R and at block 62 the next random number N is selected within the range 0 through D−1 without repeating used numbers. In the alternative, where counter W is equal to divisor D at block 78, all the numbers in the range 0 through D−1 have been selected in the most recent D cycles and control passes back up to block 56 as described below.

During a next run through blocks 58 through 78 assume signal S remains unchanged (i.e., in the present example S=2256) and that the computed random number N is 103. In this case, at block 64 number 103 is stored as a "used" value and control passes to block 66. At block 66, random number 103 is greater than the remainder 80 and therefore control passes to block 68 where the first count (e.g., 17 in the present example) is selected. At block 74 selected count 17 is provided to register 50. Next, regulator 52 uses the selected count 17 to generate a PWM voltage pulse on line 22 (see FIG. 1) having a duration corresponding to the count 17. Referring still to FIGS. 2 and 3, control again passes back down to block 78.

Eventually, after having passed through blocks 58 through 74 128 times, the cycle count W will equal divisor D. At this point, every value within the range 0 through D−1 has been selected as a random number N and control again passes to block 56 where cycle counter W is again set equal to 0 and all values 0 through D−1 are again set as unused.

During D cycles, if the request signal S is altered at block 58, the process continues with new Q and R values at block 60. Importantly counter W need not be re-zeroed and the "used" numbers need not be reset as "unused" (i.e., see block 56). Instead, determiner 48 simply continues in the same D cycle random number generating sequence. At the end of D cycles control again passes to block 56 where counter W is re-zeroed and all 0 through D−1 numbers are set afresh as unused.

Figure 5:
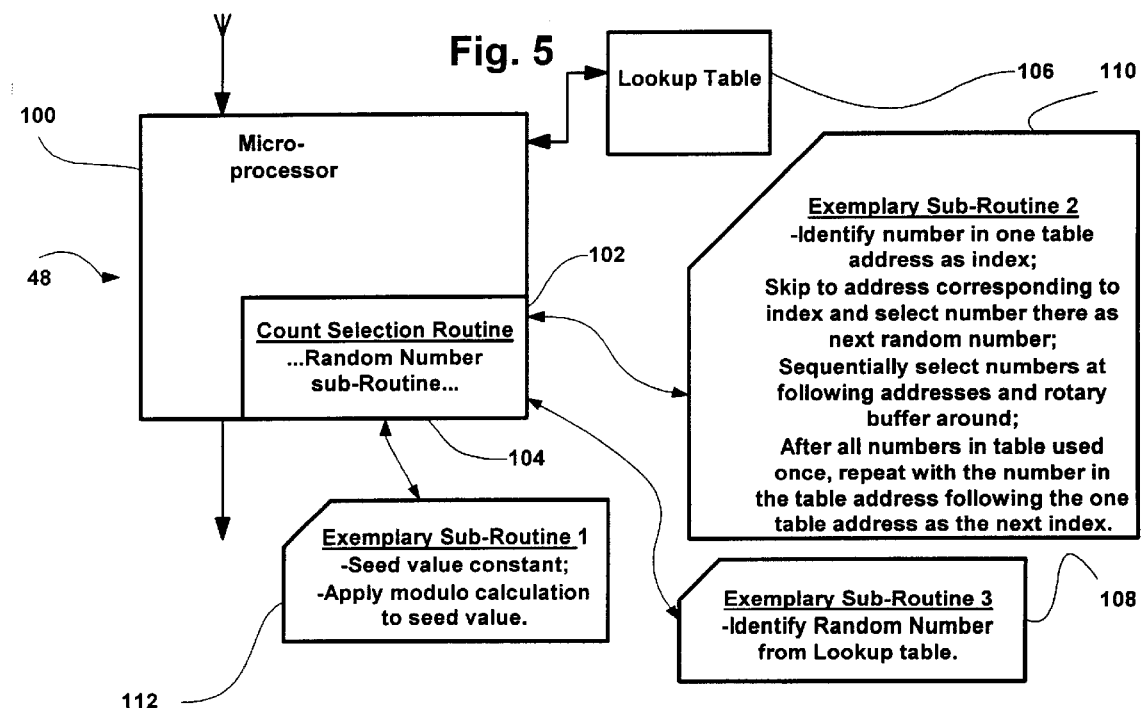
FIG. 5 is a schematic illustrating one embodiment of the determiner of FIG. 2 capable of performing several different random number generating sub-routines.

Referring again to FIG. 3, the present invention contemplates that there are several different methods to compute random numbers at block 62 and the present invention may be practiced using any such method. Referring also to FIG. 5, processor 48 is shown in a bit more detail including a micro-processor 100 and the count selection routine 102 including a random number sub-routine 104. Three exemplary random number sub-routines 108, 110 and 112 are illustrated, processor 100 capable of employing any of the sub-routines to generate random numbers.

A first contemplated random number sub-routine 112 employs a pseudo-random number generated that requires a seed number and performs a modulo calculation as well known in the controls art. With a pseudo-random generator the generator automatically avoids repeating numbers in a sequence until all numbers within the sequence have been employed once and, if the seed number is unchanged, repeats the random number sequence during each PWM cycle set.

In this case, method 54 in FIG. 3 would be slightly different as used numbers would not have to be stored at block 64. While a pseudo-random number generator with a constant seed value is employed, to reduce the effects of limit cycles count Y (i.e., the maximum request signal count) should be much larger than count X (the maximum timer register count). To this end, where a pseudo-random generator with a constant seed value is employed count Y should be at least 8x−1.

Referring still to FIG. 5, according to third sub-routine 108, a look-up table (e.g., table 106) may be employed by processor 100, the table storing number 0 through D−1 in a sequential list that was randomly generated. In this case the determiner selects list numbers consecutively during consecutive PWM cycles.

To essentially eliminate limit cycling using a look-up table, according to third sub-routine 110 each new PWM cycle set (i.e., in FIG. 3, each time through process block 56) a new table index value can be used to identify the beginning point within the table. In this manner the sequence of random numbers varies between consecutive PWM cycle sets. In one embodiment a look-up table 106 of values may be provided that is accessible to processor 100 for identifying different random values. For example, table 106 may include randomly arranged numbers 1 through 128 at 128 consecutive addresses. For instance, the first address may include number 52, the second address may include number 118 and so on through the $128^{th}$ consecutive address. In this case processor 48 identifies the numbers in the consecutive addresses as indexes that indicate where to begin a 128 cycle random number process. In the above example, processor 48 begins with the number in the first address as an initial index. Thus, because the first address number is 52, processor 48 skips to address 52 and selects as the first random number the number at address 52. The second random number is then the number stored at address 53 and so on. When processor 48 gets to the number in address 128, processor 48 "rotary buffers" back to the first address for the next random number and cycles through the consecutive addresses back up to address 51.

Next processor 48 again skips to address 2 to identify the next starting index address. In the above example the second address number is 118 and hence processor 48 skips to address 118 to select the first random number for the next 128 cycles. After the next 128 cycles through address 128 and from address 1 through 117, processor 48 skips to address 3 for the next initial index address. This process continues resulting in a mixed-up random number process.

It should be understood that the methods and apparatuses described above are only exemplary and do not limit the scope of the invention, and that various modifications could be made by those skilled in the art that would fall under the scope of the invention.

For example, referring again to FIG. 3, while an inventive method is described wherein "used" random numbers are not selected during a D cycle set, the invention also contemplates methods and apparatus wherein the random numbers are selected with uniform likelihood so that the probability of selecting any number in the range 0 through D−1 is very nearly $$\frac{1}{(D-1)}.$$

This uniform likelihood randomness can generate even better and less cyclical results under most operating conditions.

To apprise the public of the scope of this invention, the following claims are made:

What is claimed is:

1. A method for use with a PWM controller that controls coil voltage within a voltage range by regulating voltage pulse widths across the coil using a PWM counter register having a register range between 0 and X and wherein 1 part in X resolution is insufficient to provide required resolution, the method for increasing output resolution and comprising the steps of;
   (a) receiving a high resolution voltage magnitude request signal S corresponding to a request voltage within the voltage range, the signal S having a resolution greater than 1 part in X;
   (b) identifying first and second consecutive counts between 0 and X corresponding to lower and upper voltage levels below and above the request voltage;
   (c) over the course of D PWM cycles, randomly selecting between the first and second counts such that the ratio of second to first counts over the D cycles is essentially equal to the difference between the request voltage and the lower voltage divided by the difference between the upper voltage and the lower voltage; and
   (d) providing the selected counts as the counter register counts.

2. The method of claim 1 wherein the step of receiving includes receiving the signal S from within a count range 0 through Y where the value corresponding to count Y is essentially equal to the value corresponding to count X and where count Y is greater than count X and wherein the step of identifying the first count includes dividing the request signal S by the value D to obtain the first count and a remainder R where the value D is essentially equal to Y/X.

3. The method of claim 2 wherein Y is at least 8x−1, the step of identifying the second count includes incrementing the first count and the step of randomly selecting includes identifying a pseudo-random number N within the range 0 through D−1, comparing the remainder R and the random number N and, if the random number N is less than the remainder R, selecting the second count, else selecting the first count and, over each D PWM cycles identifying each of 0 through D−1 only once and repeating the order of random numbers every D PWM cycles.

4. The method of claim 3 wherein Y is 128X−1.

5. The method of claim 4 wherein X is 255.

6. The method of claim 3 wherein the controller has access to a lookup table including a listing of the D non-recurring random numbers 0 through D−1 and the step of selecting includes sequentially selecting numbers from the table.

7. The method of claim 3 wherein the step of identifying a random number includes identifying a seed value and generating a pseudo-random number as a function of the seed value.

8. The method of claim 2 wherein the step of identifying the second count includes incrementing the first count and the step of randomly selecting includes identifying a random number N within the range 0 through D−1, comparing the remainder R and the random number N and, if the random number N is less than the remainder R, selecting the second count, else selecting the first count, over each D PWM cycles identifying each of 0 through D−1 only once, and identifying random numbers within the range 0 through D−1 in different orders for consecutive D PWM cycles.

9. The method of claim 8 wherein the step of identifying a random number includes receiving a seed value, generating a pseudo-random number as a function of the seed value and providing a new seed value every D PWM cycles.

10. The method of claim 8 wherein Y is at least 8X−1.

11. The method of claim 10 wherein Y is at least 128X−1.

12. The method of claim 11 wherein X is at least 255.

13. A processor for running a pulse sequencing program for use with a PWM controller that controls coil voltage within a voltage range by regulating voltage pulse widths across the coil using a PWM counter register having a register range between 0 and X and wherein 1 part in X resolution is insufficient to provide required resolution, the processor for increasing output resolution by running the pulse sequencing program to perform the steps of:

(a) receiving a high resolution voltage magnitude request signal S corresponding to a request voltage within the voltage range, the signal S having a resolution greater than 1 part in X;

(b) identifying first and second consecutive counts between 0 and X corresponding to lower and upper voltage levels below and above the request voltage;

(c) over the course of D PWM cycles, randomly selecting between the first and second counts such that the ratio of second to first counts over the D cycles is essentially equal to the difference between the request voltage and the lower voltage divided by the difference between the upper voltage and the lower voltage; and (d) providing the selected counts as the counter register counts.

14. The processor of claim 13 wherein the processor performs the program that the step of receiving includes receiving the signal S from within a count range 0 through Y where the value corresponding to count Y is essentially equal to the value corresponding to count X and where count Y is greater than count X and wherein the step of identifying the first count includes dividing the request signal S by the value D to obtain the first count and a remainder R where the value D is essentially equal to Y/X.

15. The processor of claim 14 wherein Y is at least 8X−1 and, wherein the processor performs the program such that the step of identifying the second count includes incrementing the first count and the step of randomly selecting includes identifying a pseudo-random number N within the range 0 through D−1, comparing the remainder R and the random number N and, if the random number N is less than the remainder R, selecting the second count, else selecting the first count and, over each D PWM cycles identifying each of 0 through D−1 only once and repeating the order of random numbers every D PWM cycles.

16. The processor of claim 15 wherein the processor performs program such that the step of identifying a random number includes receiving a seed value and generating a pseudo-random number as a function of the seed value.

17. The processor of claim 14 wherein the processor performs the program such that the step of identifying the second count includes incrementing the first count and the step of randomly selecting includes identifying a random number N within the range 0 through D−1, comparing the remainder R and the random number N and, if the random number N is less than the remainder R, selecting the second count, else selecting the first count, over each D PWM cycles identifying each of 0 through D−1 only once and identifying random numbers within the range 0 through D−1 in different orders for consecutive D PWM cycles.

18. The processor of claim 17 wherein the processor performs the program such that the step of identifying a random number includes receiving a seed value, generating a pseudo-random number as a function of the seed value and receiving a new seed value every D PWM cycles.

19. The processor of claim 14 wherein Y is at least 8X−1.

20. The processor of claim 19 wherein Y is at least 128X−1 and X is at least 255.

* * * * *